United States Patent
Suzuki

(10) Patent No.: US 9,693,081 B2
(45) Date of Patent: Jun. 27, 2017

(54) RECEIVER, DISPLAY APPARATUS AND NON-TRANSITORY COMPUTER-READABLE STORAGE MEDIUM STORING RECEIVING CONTROL PROGRAM

(71) Applicant: CANON KABUSHIKI KAISHA, Tokyo (JP)

(72) Inventor: Yasuo Suzuki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 58 days.

(21) Appl. No.: 14/720,194

(22) Filed: May 22, 2015

(65) Prior Publication Data
US 2015/0350705 A1 Dec. 3, 2015

(30) Foreign Application Priority Data
May 30, 2014 (JP) .................................. 2014-112835

(51) Int. Cl.
| | | |
|---|---|---|
| *G06F 13/00* | (2006.01) | |
| *H04N 21/236* | (2011.01) | |
| *H04N 7/083* | (2006.01) | |
| *H04N 21/242* | (2011.01) | |
| *H04N 21/434* | (2011.01) | |
| *G06F 5/16* | (2006.01) | |

(52) U.S. Cl.
CPC ....... *H04N 21/23614* (2013.01); *H04N 7/083* (2013.01); *H04N 21/242* (2013.01); *H04N 21/4348* (2013.01)

(58) Field of Classification Search
CPC ............... G06F 3/00; G06F 5/16; G06F 13/00
USPC .................................................. 710/51, 36–38
See application file for complete search history.

(56) References Cited

U.S. PATENT DOCUMENTS

| | | | |
|---|---|---|---|
| 5,357,108 A | 10/1994 | Suzuki et al. | |
| 5,659,369 A * | 8/1997 | Imaiida | H04N 7/0122 348/240.2 |
| 6,130,885 A | 10/2000 | Izumi et al. | |
| 6,573,931 B1 * | 6/2003 | Horii | H04N 5/23203 348/211.14 |
| 7,150,032 B1 * | 12/2006 | Sadanaka | H04L 12/18 348/E5.108 |
| 2001/0052126 A1 * | 12/2001 | Nanki | H04N 5/44543 725/55 |
| 2002/0019979 A1 * | 2/2002 | Koreeda | G11B 27/105 725/39 |
| 2002/0171761 A1 * | 11/2002 | Suzuki | H04N 7/083 348/484 |

(Continued)

*Primary Examiner* — Christopher Shin
(74) *Attorney, Agent, or Firm* — Fitzpatrick, Cella, Harper & Scinto

(57) ABSTRACT

The receiver is connectable to at least one of plural transmitters and configured to receive, from a connected transmitter, a transmission signal in which an image signal and a control signal are multiplexed, the plural transmitters having mutually different specifications on the control signal. The receiver includes a demultiplexer configured to demultiplex the transmission signal received from the connected transmitter into the image signal and the control signal, a selector configured to select a signal path for the demultiplexed control signal, an information acquirer configured to acquire first information to be used to identify the connected transmitter, and a controller configured to control the selection of the signal path by the selector depending on the first information.

11 Claims, 10 Drawing Sheets

(56) References Cited

U.S. PATENT DOCUMENTS

| | | | | |
|---|---|---|---|---|
| 2003/0115608 A1* | 6/2003 | Armstrong | ............ | H04N 7/106 |
| | | | | 725/78 |
| 2009/0074040 A1 | 3/2009 | Lida et al. | | |
| 2013/0155260 A1* | 6/2013 | Kim | ...................... | H04N 7/183 |
| | | | | 348/207.1 |
| 2015/0358363 A1* | 12/2015 | Park | ...................... | H04L 12/12 |
| | | | | 709/227 |

* cited by examiner

| VENDOR ID | PRODUCT ID | VENDOR | MODEL NAME |
|---|---|---|---|
| aaaa | nnmm | A COMPANY | (A1) |
| aaaa | ffhh | A COMPANY | (A2) |
|  |  |  |  |
| cccc | pded | C COMPANY | (C1) |

FIG. 5A

| MODEL NAME | CONTROL Ch | VIDEO/AUDIO | RC | COMMAND |
|---|---|---|---|---|
| (A1) | UART:CH0 RC:CH3 | VIDEO:HDMI AUDIO:HDMI | WIRED NO CAREER SIGNAL (BASE BAND) | COMMAND THROUGH |
| (A2) | UART:CH0 RC:NONE | VIDEO:HDMI/VGA AUDIO:HDMI/Line-IN | NONE (NONE) | COMMAND THROUGH |
|  |  |  |  |  |
| (C1) | UART:CH1 RC:CH2 | VIDEO:DVI/COMPONENT AUDIO:NONE | WIRED CAREER SIGNAL f=33kHz | C COMPANY- SPECIFIC COMMAND |

FIG. 5B

| VENDOR ID | PRODUCT ID | VENDOR | MODEL NAME |
|---|---|---|---|
| aaaa | nnmm | A COMPANY | (A1) |
| aaaa | ffhh | A COMPANY | (A2) |
|  |  |  |  |
| bbbb | pqpq | B COMPANY | (B1) |
| cccc | pded | C COMPANY | (C1) |

FIG. 9A

| MODEL NAME | CONTROL Ch | VIDEO/AUDIO | RC | COMMAND |
|---|---|---|---|---|
| (A1) | UART:CH0 RC:CH3 | VIDEO:HDMI AUDIO:HDMI | WIRED NO CAREER SIGNAL (BASE BAND) | COMMAND THROUGH |
| (A2) | UART:CH0 RC:NONE | VIDEO:HDMI/VGA AUDIO:HDMI/Line-IN | NONE (NONE) | COMMAND THROUGH |
|  |  |  |  |  |
| (B1) | UART:CH3 RC:CH4 :CH5 | VIDEO:VGA/COMPOSITE AUDIO:MIC*2 | INFRARED CAREER SIGNAL f=38kHz | B COMPANY- SPECIFIC COMMAND |
| (C1) | UART:CH1 RC:CH2 | VIDEO:DVI/COMPONENT AUDIO:NONE | WIRED CAREER SIGNAL f=33kHz | C COMPANY- SPECIFIC COMMAND |

FIG. 9B

RECEIVER, DISPLAY APPARATUS AND NON-TRANSITORY COMPUTER-READABLE STORAGE MEDIUM STORING RECEIVING CONTROL PROGRAM

BACKGROUND OF THE INVENTION

Field of the Invention

The present invention relates to a multiplex receiver that receives a transmission signal in which an image signal and a control signal are multiplexed and a display apparatus including the multiplex receiver.

Description of the Related Art

Apparatuses are commercialized which comply with HDBaseT, a multiplex connection standard, which is used to transmit a multiplexed signal in which a full high-definition image, audio, data of Ethernet®, serial control signals, power and others are multiplexed through a single Ethernet cable. The HDBaseT includes a function of transmission of the image and audio as its basic function, and can include optional functions of transmission of the Ethernet data, the serial control signals (UART <command> signal and RC <remote control> signal) and the power. In addition, while the HDBaseT provides six channels in total for the serial control signals, specifications of such HDBaseT-compliant apparatuses on assignment of the six channels to the control signals, a communication protocol of the transmitted control signal and others depend on their manufacturers (vendors). For this reason, connecting the HDBaseT-compliant apparatuses whose specifications are mutually different is highly likely to cause a fault related to their connection compatibility.

U.S. Patent Publication No. 2009/0074040A1 discloses a method of performing, between connected transmitter and receiver, a negotiation on basic function compatibility information (i.e., information on compatibility or incompatibility with LAN and control signals such as UART and RC signals).

However, the method disclosed in U.S. Patent Publication No. 2009/0074040A1 negotiates only the basic function compatibility information and therefore cannot acquire detailed information on:

1. control channels used to transmit the control signals such as the UART and RC signals;
2. a communication protocol of the UART signal;
3. whether the RC signal is a wired remote control signal or an infrared remote control signal;
4. whether or not the RC signal includes a carrier signal;
5. an interface (e.g., DVI, analog VGA and composite) of an image signal;
6. a type of an audio signal (i.e., a line input signal or a microphone input signal); and others.

For this reason, if the receiver is connected to various transmitters whose specifications are different from that of the receiver, the receiver cannot accept various control signals from the transmitters and cannot set appropriate image/audio processing parameters corresponding to various interfaces provided to the transmitters.

SUMMARY OF THE INVENTION

The present invention provides a receiver capable of performing an appropriate process corresponding to a control signal and an image signal multiplexed by and transmitted from each of transmitters whose specifications are mutually different. The present invention further provides a display apparatus including the receiver.

The present invention provides as an aspect thereof a receiver connectable to at least one of plural transmitters and configured to receive, from a connected transmitter of the plural transmitters, a transmission signal in which an image signal and a control signal are multiplexed, the plural transmitters having mutually different specifications on the control signal. The receiver includes a demultiplexer configured to demultiplex the transmission signal received from the connected transmitter into the image signal and the control signal, a selector configured to select a signal path for the demultiplexed control signal, an information acquirer configured to acquire first information to be used to identify the connected transmitter, and a controller configured to control the selection of the signal path by the selector depending on the first information.

The present invention provides as another aspect thereof a display apparatus including the above receiver, and a displayer configured to display an image corresponding to the image signal output from the receiver.

The present invention provides as still another aspect thereof a non-transitory computer-readable storage medium storing a computer program to operate a computer included in a receiver, the receiver being connectable to at least one of plural transmitters and configured to receive, from a connected transmitter of the plural transmitters, a transmission signal in which an image signal and a control signal are multiplexed, the plural transmitters having mutually different specifications on the control signal. The computer program is configured to cause the computer to demultiplex the transmission signal received from the connected transmitter into the image signal and the control signal, to select a signal path for the demultiplexed control signal, to acquire first information to be used to identify the connected transmitter, and to control the selection of the signal path by the selector depending on the first information.

Further features of the present invention will become apparent from the following description of exemplary embodiments with reference to the attached drawings.

BRIEF DESCRIPTION OF THE DRAWINGS

FIGS. 5A and 5B illustrate an example of an ID-specification table in Embodiment 1.

FIGS. 9A and 9B illustrate an example of an updated ID-specification table in Embodiment 2.

DESCRIPTION OF THE EMBODIMENTS

Exemplary embodiments of the present invention will be described below with reference to the attached drawings.

Embodiment 1

Figure 1:
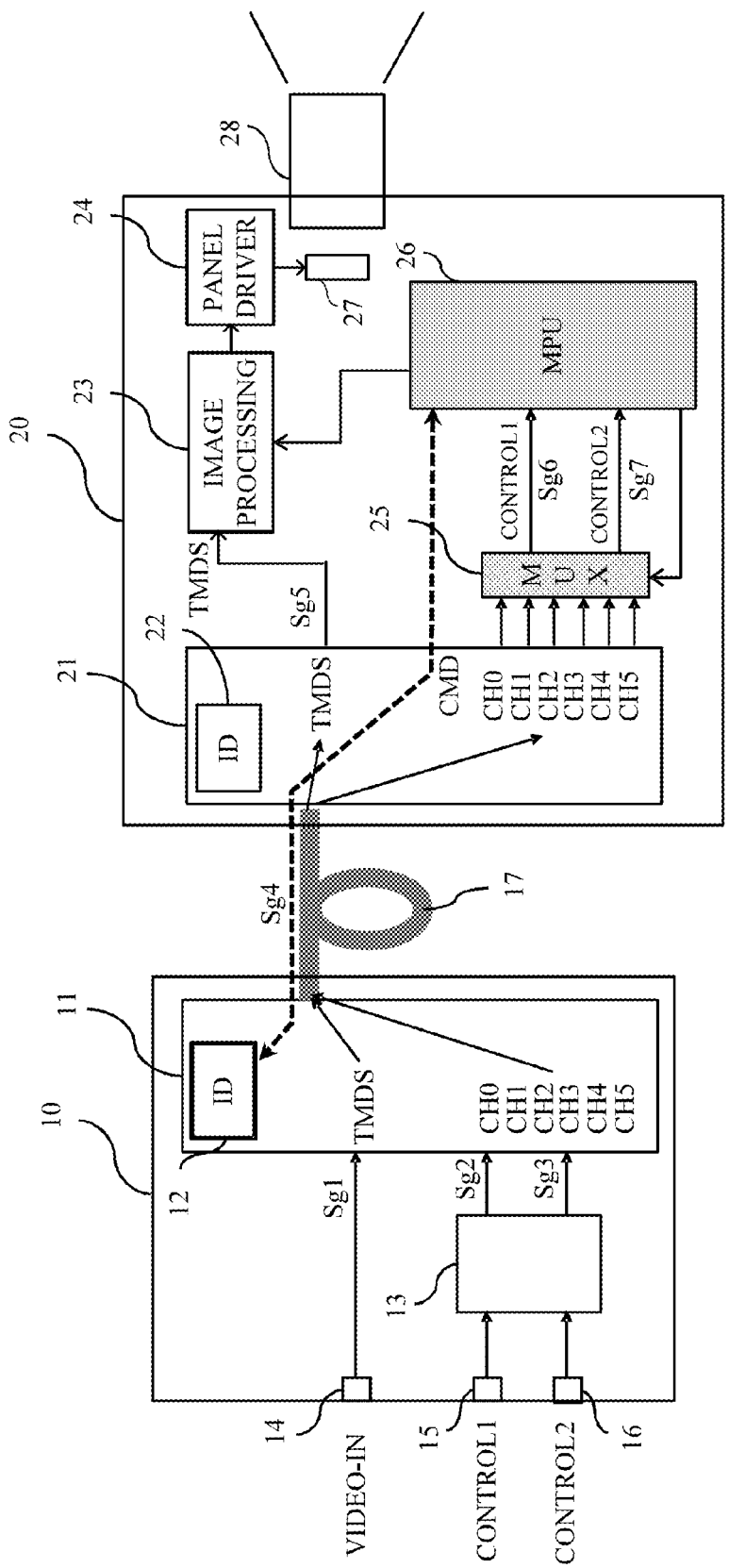
FIG. 1 is a block diagram illustrating a configuration of a projector including a multiplex receiver that is Embodiment 1 of the present invention and a configuration of a multiplex transmitter.

FIG. 1 illustrates a basic configuration of a liquid crystal projector as a display apparatus including a multiplex receiver that is a first embodiment (Embodiment 1) of the present invention and a basic configuration of a multiplex transmitter connected to the projector.

In FIG. 1, reference numeral 10 denotes an HDBaseT transmitter as the multiplex transmitter, and a projector including an HDBaseT receiver as the multiplex receiver. Reference numeral 17 denotes an HDBaseT cable that is represented by an Ethernet® cable and that is a single transmission cable connecting the transmitter 10 and the projector (that is, and the receiver). In the transmitter 10, reference numeral 11 denotes an HDBaseT transmitting device as a multiplexer. On the other hand, in the projector 20, reference numeral 21 denotes an HDBaseT receiving device as a demultiplexer.

In the transmitter 10, an image signal (containing an audio signal) Sg1 input from its outside to its image input connector (Video-In) 14 is input to the transmitting device 11. On the other hand, plural types of (two types in this embodiment) control signals Sg2 and Sg3 respectively input to a first control connector (Control 1) 15 and a second control connector (Control 2) 16 are converted by a command converter 13 into predetermined-format signals as needed and then input to the transmitting device 11. The transmitting device 11 multiplexes, by a method according to HDBaseT technology, the image signal Sg1 and the control signals Sg2 and Sg3 input thereto into an HDBaseT signal (transmission signal) Sg4. Thereafter, the transmitting device 11 transmits the HDBaseT signal Sg4 through the HDBaseT cable 17 to the projector 20. While the HDBaseT provides six transmission channels for control signals, selection of channels to be used basically depends on a transmitter manufacturer (hereinafter referred to also as "a vendor").

After receiving the HDBaseT signal Sg4, the receiving device 21 demultiplexes the HDBaseT signal Sg4 into an image signal Sg5 and control signals Sg6 and Sg7 by the method scheme consistent with the HDBaseT technique. A projector MPU 26 controls, depending on actually used transmission channels, switching of an MUX 25 as a selector and extracts the control signals Sg6 and Sg7.

The image signal Sg5 is subjected to various signal processes by an image signal processor (image processor) 23 to be converted into a panel display-purpose image signal. The panel display-purpose image signal is output to a panel driver 24. The panel driver 24 displays an image corresponding to the panel display-purpose image signal on a liquid crystal panel 27. The liquid crystal panel 27 modulates light from a light source (not illustrated) to produce an image light. The image light is projected onto a projection surface such as a screen through a projection optical system 28. Thus, an image corresponding to the image signal Sg5 (Sg1) is projected onto the projection surface. The panel driver 24, the liquid crystal panel and the projection optical system 28 constitute a displayer.

On the other hand, the control signals Sg6 and Sg7 are input to the projector MPU (transmitter correspondence controller) 26 serving as a controller and a processor. The projector MPU 26 decodes contents of the control signals Sg6 and Sg7 and executes a command process corresponding to decoding results.

The transmitting device 11 and the receiving device 20 are respectively provided with ID information and ID information 22, each of which is a data string showing identification data indicating its manufacturer (vendor) and its model name as the transmitter or the projector (receiver) 20. The projector MPU 26 is capable of acquiring and holding (storing) the ID information 12 of the transmitter 10 through the HDBaseT cable 17.

Figure 2:
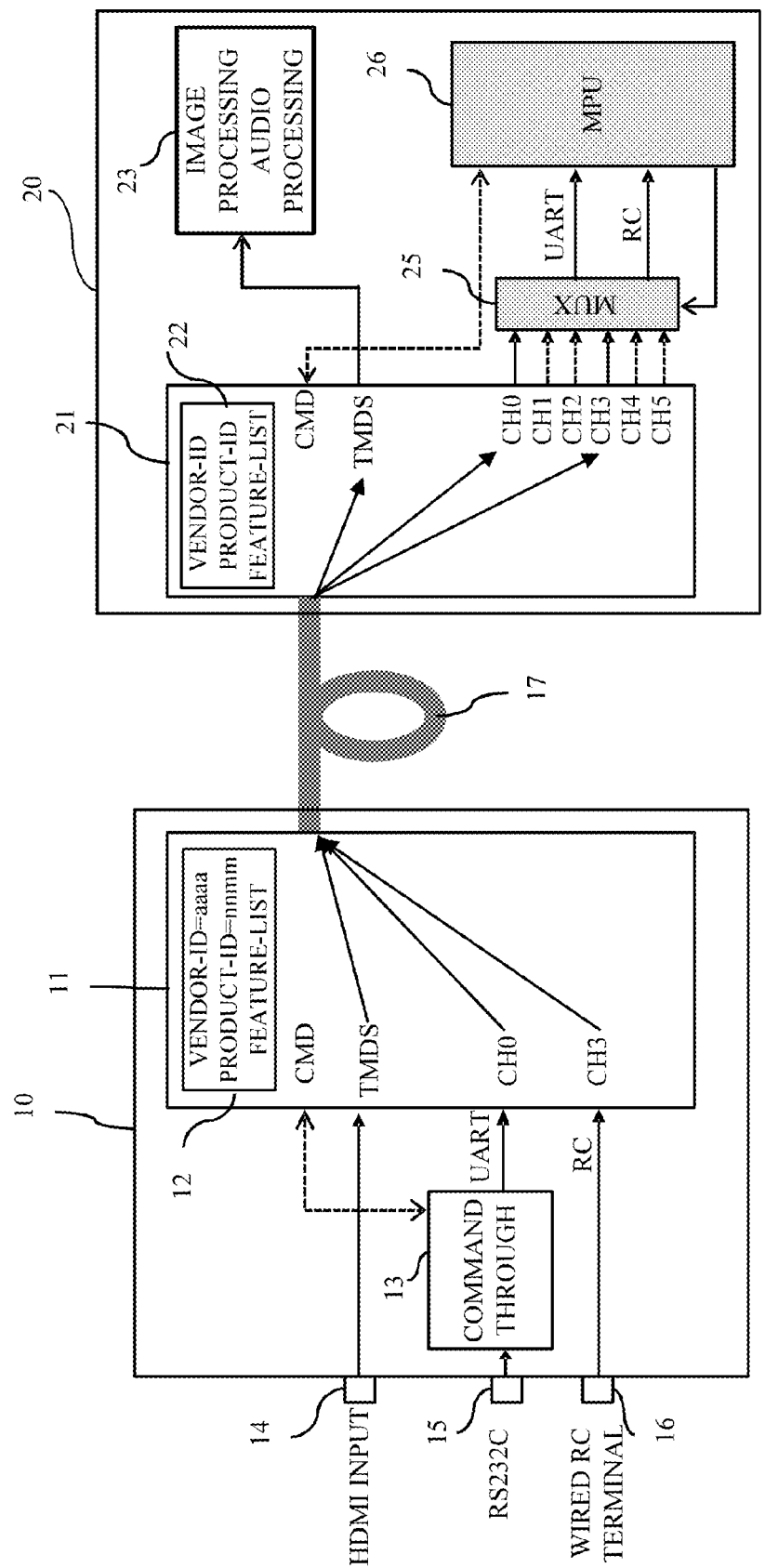
FIG. 2 is a detailed block diagram illustrating part of the receiver of Embodiment 1 and the transmitter.

FIG. 2 illustrates further embodied examples of the signals and partial configurations both illustrated in FIG. 1. The image input connector 14 is used to input an HDMI® signal (or another digital image signal) as the image signal shown in FIG. 1. The first control connector 15 is used to input an RS232C signal as the control signal Sg2 shown in FIG. 1. The command converter 13 directly transfers the RS232C signal without changing its command as a command signal that is a UART (universal asynchronous receiver/transceiver) signal to the transmitting device 11. A wired remote control signal as the control signal Sg3 shown in FIG. 1 is input to the second control connector 16. The wired remote control signal is directly input to the transmitting device 11 as an RC (remote control) signal.

The transmitter 10 illustrated in FIG. 2 has a specification that assigns the UART signal and the RC signal to a channel 0 and a channel 3, respectively, among six control signal transmission channels.

In addition, the transmitter 10 and the projector 20 are respectively provided with the ID Information 12 and the ID Information 22 each including the following at least three data:
Vendor-ID;
Product-ID; and
Feature-List.

The Vendor-ID is a vendor-specific number, and the Product-ID is a product-specific number in the vendor. On the other hand, the Feature-List is information listing functions provided to the apparatuses (10 and 20) such as compatibility with the Ethernet and compatibility with the UART signals and other control signals.

Figure 3:
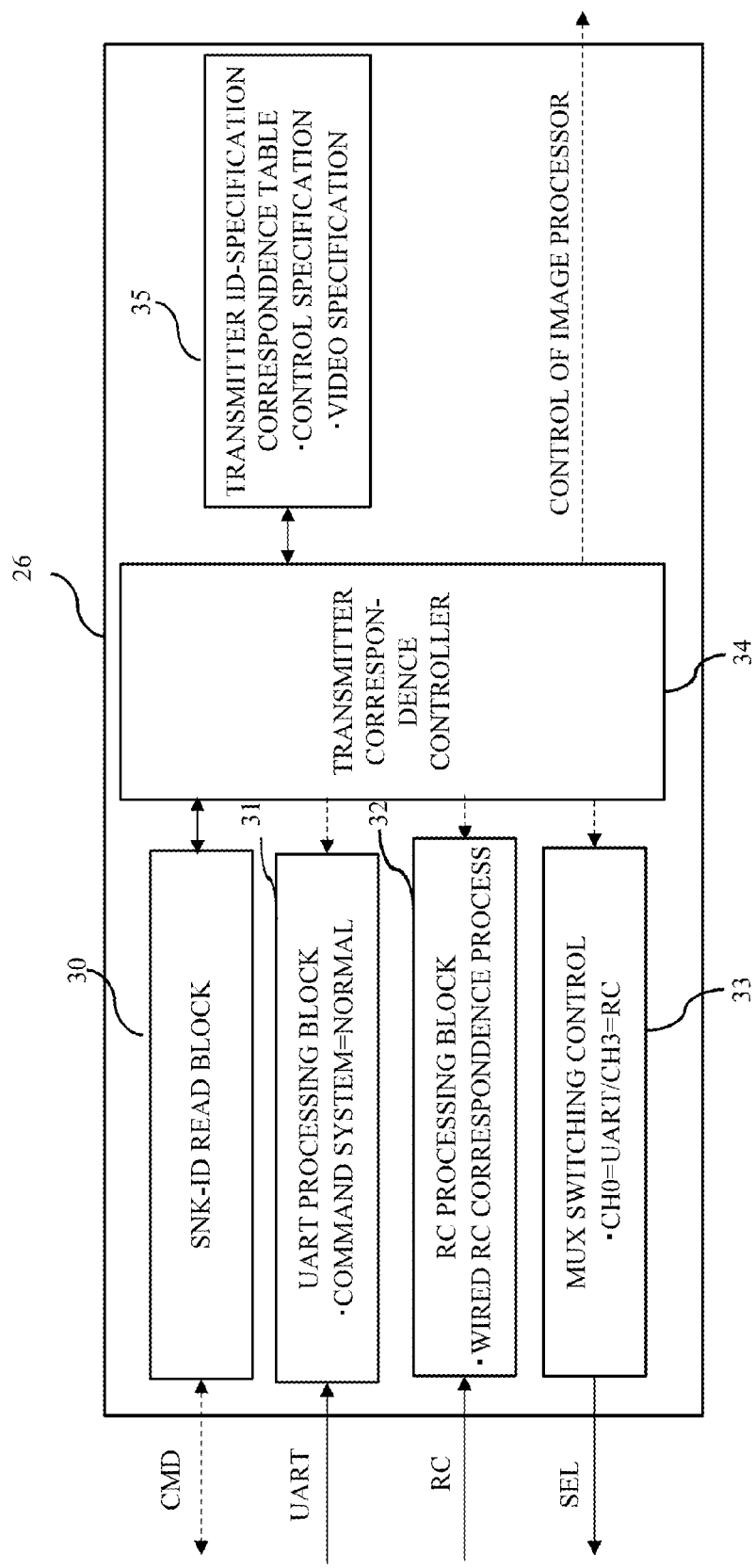
FIG. 3 is a block diagram illustrating an internal configuration of an MPU in the receiver of Embodiment 1.

FIG. 3 illustrates an internal configuration of the projector MPU 26. Reference numeral 30 denotes an ID reading block as an information acquirer that reads (acquires) the ID information (first information) from the transmitter 10. Reference numeral 31 denotes a UART processing block that performs a UART process depending on the UART signal from the transmitter 10. Reference numeral 32 denotes an RC processing block that performs an RC process depending on the RC signal from the transmitter 10. Reference numeral 34 denotes a transmitter-compliant controlling block (controller) that causes the UART processing block 31 and the RC processing block 32 to perform processes depending on specifications on the image signal and the control signal of the transmitter (connected transmitter) 10 currently connected to the projector 20. The UART and RC processing blocks 31 and 32 correspond to plural processors that respectively perform mutually different processes corresponding to plural control signals, depending on specifications of the transmitter 10 on the control signals.

Reference numeral 33 denotes an MUX switching controlling block that performs switching control of the MUX 25 described above. The MUX 25 switches (selects) signal paths (that is, channels) so as to introduce the demultiplexed UART and RC signals respectively to the corresponding UART and RC processing blocks 31 and 32.

Reference numeral 35 denotes a transmitter ID-specification correspondence table. The transmitter ID-specification correspondence table 35 includes information (second information) indicating specifications on the image and control signals of each of plural transmitters having mutually different specifications thereon, the information having correspondence with the ID information of each transmitter. It is only necessary that the plural transmitters have mutually different specifications on at least one of the plural types of control signals to be multiplexed with the image signal. This applies also to Embodiment 2.

The specification on the image signal and the control signals of the transmitter 10 includes:

1. channels assigned to the control signals;
2. a type (such as HDMI, composite or VGA analog) of the image signal and a type (line input or microphone input) of the audio signal;
3. a type (i.e., wired, wireless or infrared, presence or absence of a carrier signal, and frequency) of the RC signal;
4. a command system (command through or conversion to a vendor-specific command), and others.

In the following description, a command set by the vendor (company) of the projector (receiver) 10 is referred to as "an in-company command", and a command set by another company such as an A company is referred to as "another company-specific command"; for example, "an A company-specific command".

FIGS. 5A and 5B illustrate an example of the transmitter ID-specification correspondence table 35. FIG. 5A illustrates a table showing correspondence of the Vendor-IDs and the Product-IDs with the vendors and the model names. FIG. 5B illustrates a table showing correspondence of the model names with the channels assigned to the control signals (control signal assignment channels: Control Ch), the types of the image and audio signals (image/audio types: Video/Audio), the type of the RC signal (RC signal type: RC), and information on the command system (Command). Such a transmitter ID-specification correspondence table is created by consulting the specifications of various transmitters.

For instance, as illustrated in FIG. 5A, the ID information 12 of the transmitter 10 including:
  Vendor ID=aaaa; and
  Product-ID=nnmm
shows that the model name is (A1). Furthermore, as illustrated in FIG. 5B, the ID information 12 shows:
[Control Signal Assignment Channels]
  UART signal=channel 0
  RC signal=channel 3;
[Image/Audio Types]
  image=only HDMI
  audio=only HDMI;
[RC Signal Type]
  wired remote control
  no carrier signal (base band); and
[Command System]
  command through.

For instance, as illustrated in FIG. 5A, the ID information 12 of the transmitter 10 including:
  Vendor ID=aaaa; and
  Product-ID=ffhh
shows that the model name is (A2). Furthermore, as illustrated in FIG. 5B, the ID information 12 shows:
[Control Signal Assignment Channels]
  UART signal=channel 0
  RC signal=none;
[Image/Audio Types]
  image=HDMI and VGA
  audio=HDMI and Line-IN;
[RC Signal Type]
  no remote control
[Command System]
  command through For instance, as illustrated in FIG. 5A, the ID information 12 of the transmitter 10 including:
  Vendor ID=cccc; and
  Product-ID=pded
shows that the model name is (C1). Furthermore, as illustrated in FIG. 5B, the ID information 12 shows:
[Control Signal Assignment Channels]
  UART signal=channel 1
  RC signal=channel 2
[Image/Audio Types]
  image=DVI/Component
  audio=none
[RC Signal Type]
  wired remote control
  carrier signal (frequency: 33 kHz)
[Command System]
  C company-specific command In the following description, the specifications on the image signal and the control signals of the transmitter are hereinafter referred to also simply as "specifications of the transmitter". This applies also to Embodiment 2 described later.

Figure 4:
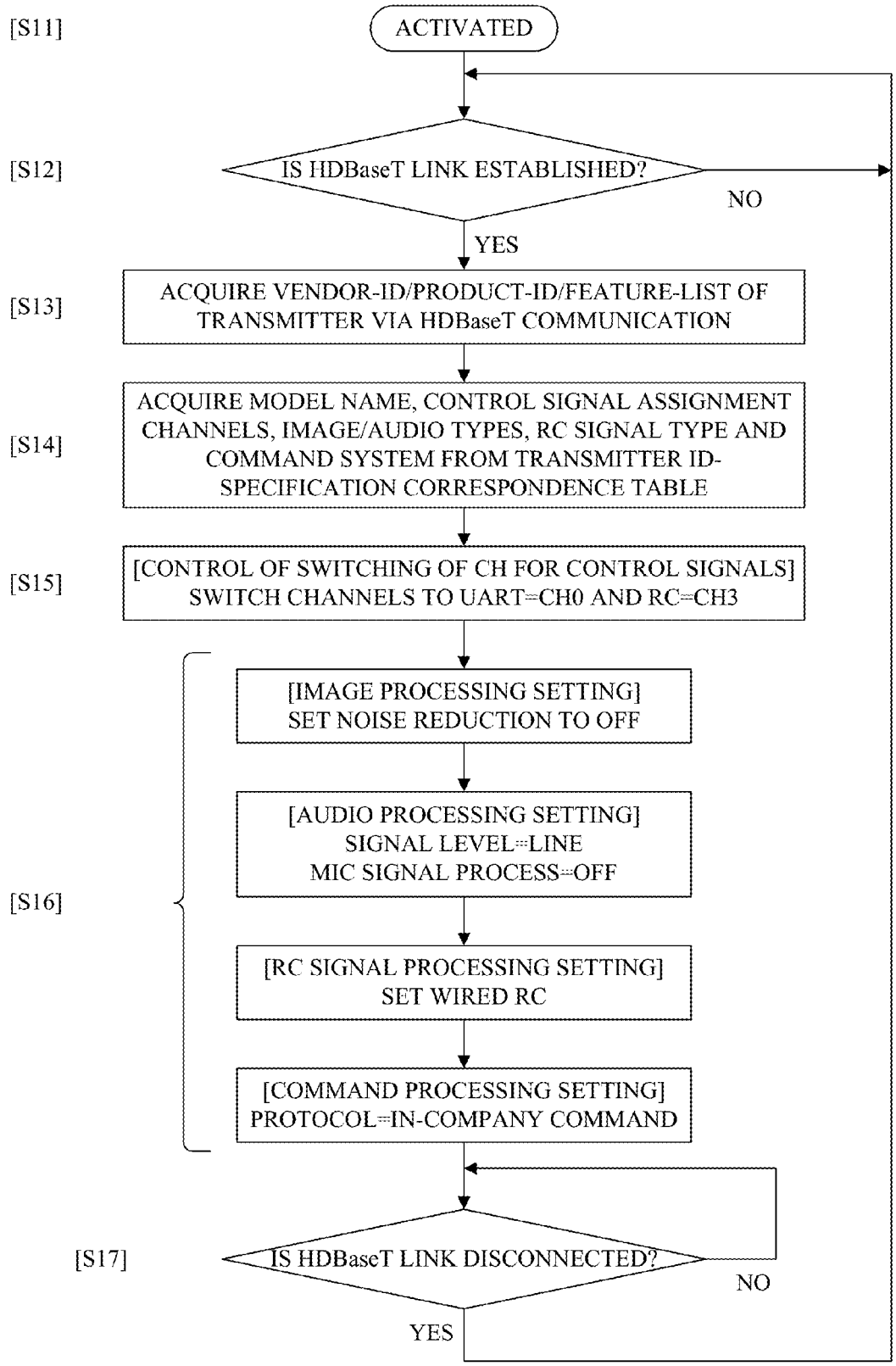
FIG. 4 is a flowchart illustrating a processing procedure in Embodiment 1.

Next, with reference to a flowchart of FIG. 4, description will be made of a receiving control process (receiving control method) executed in this embodiment by the projector MPU 26 as a computer according to a receiving control program for multiplex transmission as a computer program to operate the projector MPU 26.

At step S11, the projector MPU 26 is activated and supplies power to the receiving device 21.

Next, at step S12, the projector MPU 26 checks whether or not communication with the transmitter 10, namely, an HDBaseT link is established. When the link is not established, the projector MPU 26 periodically repeats the check until the link is established. Specifically, the projector MPU 26 performs polling (inquiry) at regular time intervals or waits for an interrupt signal from the receiving device 21 to perform the periodic check.

Next, at step S13, the projector MPU 26 acquires the ID information (first information) 12 of the transmitter 10 through the HDBaseT cable 17. Specifically, since the transmitting device 11 and the receiving device 21 are capable of respectively accepting commands for transmitting and receiving the ID information 12, the projector MPU 26 issues the commands to cause these devices 11 and 21 to transmit and receive the ID information 12 and thereby acquires the ID information 12.

Next, at step S14, the projector MPU 26 acquires information indicating the specifications of the transmitter 10 by using the acquired ID information 12. Specifically, the projector MPU 26 reads the model name corresponding to the acquired ID information (Vendor-ID and Product-ID) from the transmitter ID-specification correspondence table 35 shown in FIG. 5A. Furthermore, the projector MPU 26 reads the specifications corresponding to the model name from the transmitter ID-specification correspondence table 35 shown in FIG. 5B.

Next, at step S15, the projector MPU 26 controls switching of the MUX 25 depending on the information on the "control signal assignment channels" acquired at step S14. Specifically, when the ID information 12 includes:
  Vendor ID=aaaa; and
  Product-ID=nnmm
and shows that the model name is (A1), the projector MPU 26 switches the MUX 25 such that the UART signal and the RC signal are respectively input to CH0 and CH3.

Subsequently, at step S16, the projector MPU sets, depending on the "image/audio type", "RC signal type" and "command system" acquired at step S14, processes for the respective signals. In other words, the projector MPU 26 sets processing methods performed by the image signal processor 23, the UART processing block 31 and the RC processing block 32. Specifically, the projector MPU 26 performs the following settings.

[Image Signal Processing]

The projector MPU 26 sets an analog noise reduction to off because an input image source is a digital (HDMI) image.

[Audio Signal Processing]

The projector MPU 26 performs a lip sync delay setting and sets a microphone sound process (wind noise reduction) to off because an input sound source is an HDMI audio.

[RC Signal Process]

The projector MPU 26 sets a filtering process to off because the RC signal does not contain the carrier signal. In addition, since an input RC source is one wired RC system, the projector MPU 26 makes a setting that treats the RC signal as a single signal.

[Command Process]

Since the specification of the transmitter 10 is a command through specification (that is, a specification to directly convert RS232C data into HDBaseT data and output the HDBaseT data), the projector MPU 26 makes a setting that does not perform a conversion process on a received command.

Next, at step S17, the projector MPU 26 checks whether or not the HDBaseT link is disconnected. When the link is not disconnected, the projector MPU 26 determines that the connected transmitter 10 is not changed and maintains the settings without change. When the link is disconnected, the projector MPU 26 determines that the connected transmitter 10 is changed and thereby returns to step S12 to again perform the receiving control process starting from the acquisition of the ID information from the transmitter 10.

According to Embodiment 1 described above, the projector (receiver) is capable of identifying the specifications of the connected transmitter and performing settings for the projector suitable for the specifications, which makes it possible to provide an improved compatibility for connection between the transmitter and the projector that are provided by mutually different manufactures.

Embodiment 2

Figure 6:
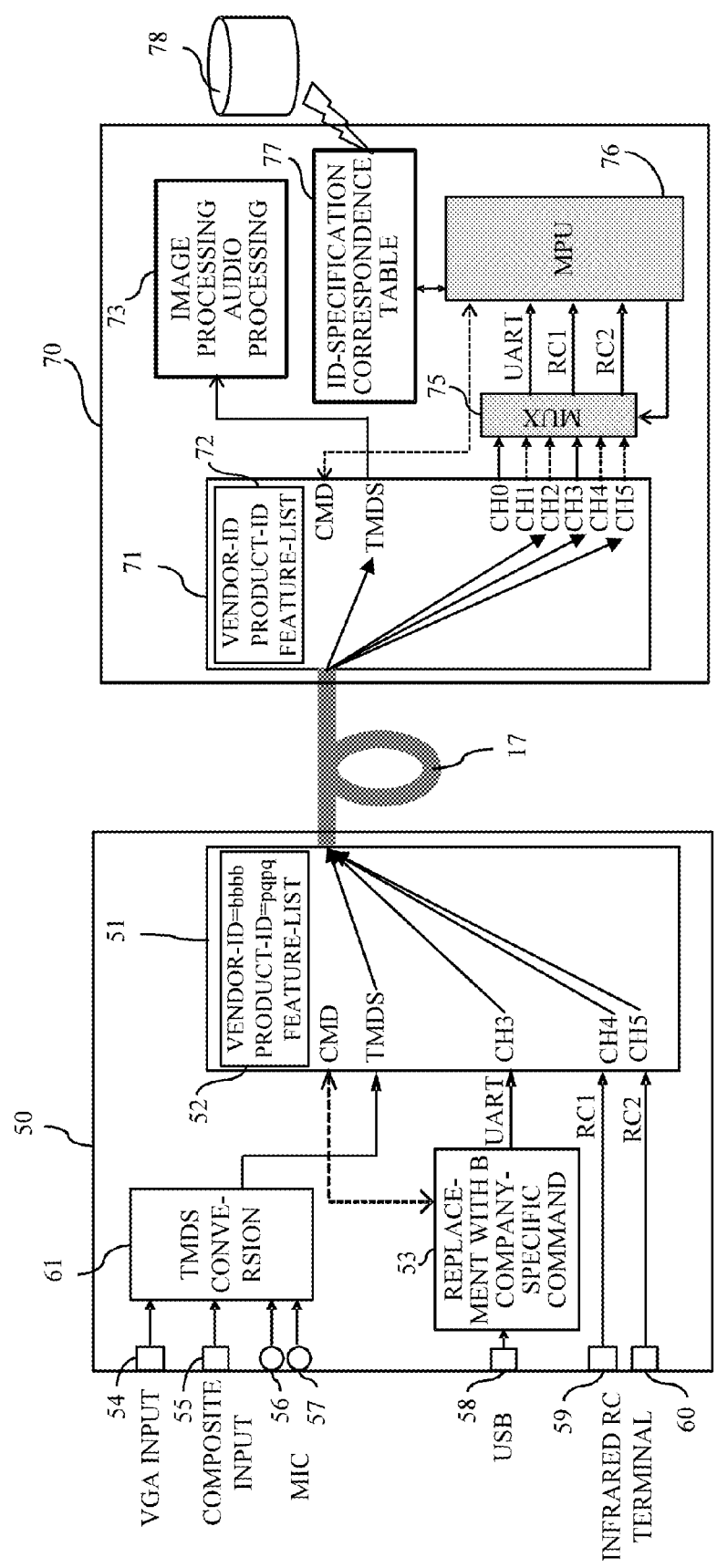
FIG. 6 is a block diagram illustrating a configuration of a projector including a multiplex receiver that is Embodiment 2 of the present invention and a configuration of a multiplex transmitter.

FIG. 6 illustrates a configuration of a liquid crystal projector 70 as a display apparatus including a receiver that is a second embodiment (Embodiment 2) of the present invention and a configuration of a transmitter 50 connected to the projector 70. Description will be made below of this embodiment with focus on differences from Embodiment 1.

In this embodiment, image signals input to the transmitter 50 are analog image signals including a VGA image signal input from a VGA input connector 54 and a composite image signal input from a composite input connector 55. On the other hand, audio signals input to the transmitter 50 are stereo-microphone audio signals input from stereo-microphone input connectors 56 and 57.

A TMDS converter 61 provided to the transmitter 50 converts the analog image signals into a digital image signal and inputs the digital image signal to an HDBaseT transmitting device 51.

A control signal 1 is a USB signal input from a USB connector 58 and is converted by a command converter 53 into a UART signal. The command converter 53 converts the UART signal by using a predetermined conversion table corresponding to a B company-specific command system. For this reason, the UART signal command transmitted through an HDBaseT cable 17 is a B company-specific command. Infrared-remote-controlled light receivers 59 and 60 are provided at front and rear sides of the transmitter 50.

The transmitter 50 has a specification that uses, as channels for the control signals, a channel 3 for the UART signal and channels 4 and 5 for RC signals.

A projector MPU (transmitter correspondence controller) 76 has a function of enabling updating (rewriting) a transmitter ID-specification correspondence table 77 stored therein by information acquired from an external server 78 through an Internet site. This function enables acquiring and storing information on the specification of a transmitter manufactured by a new vendor and that of a transmitter newly manufactured by an existing vendor. As an interface for information updating, a wired or wireless LAN or others, which is not illustrated, can be used. Alternatively, the transmitter ID-specification correspondence table 77 can be updated via a USB memory or others after information acquisition by using an external personal computer or others from the external server 78 through the Internet site, though not illustrated.

Figure 7:
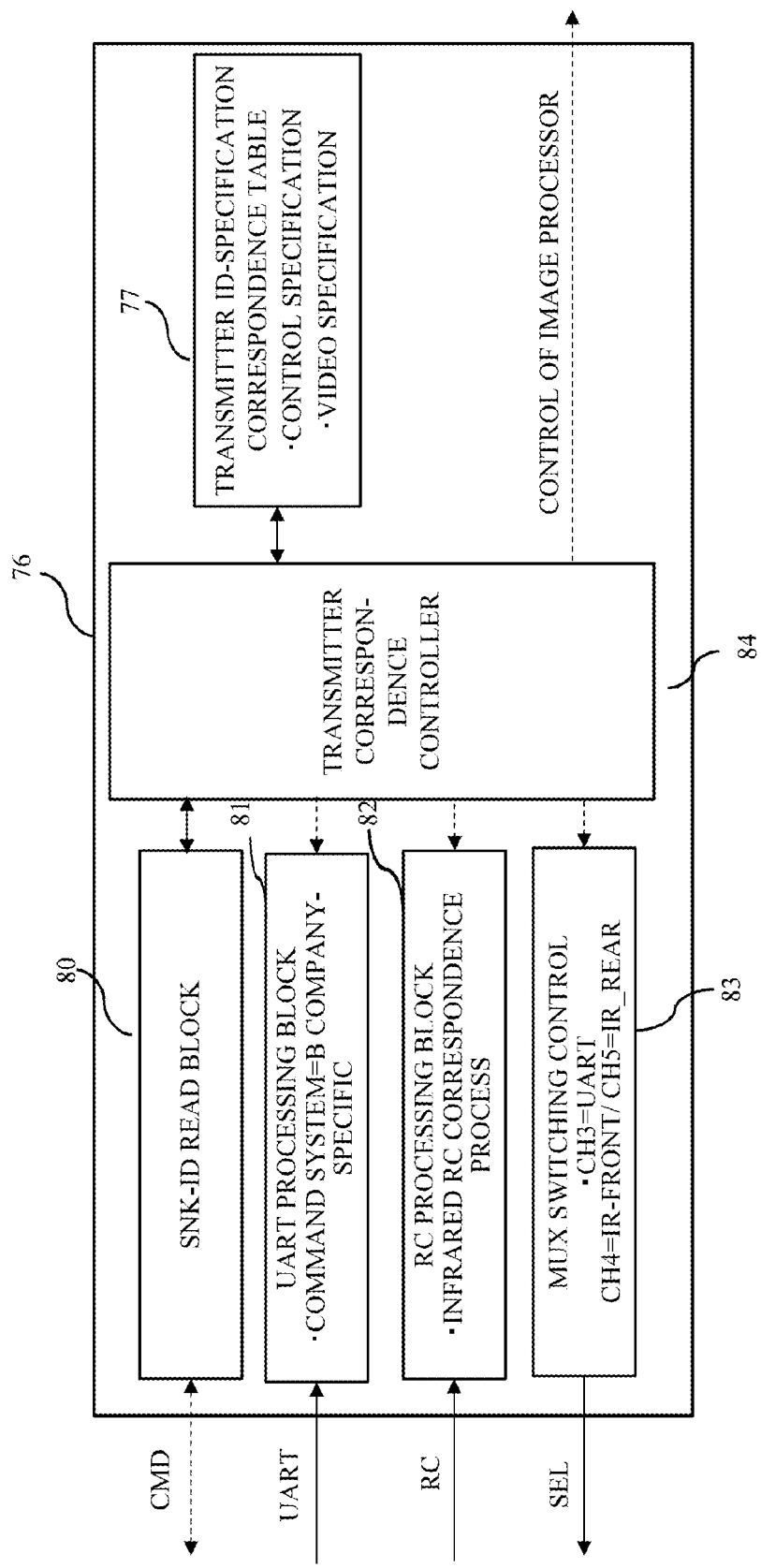
FIG. 7 is a block diagram illustrating an internal configuration of an MPU in the receiver of Embodiment 2.

FIG. 7 illustrates an internal configuration of the projector MPU 76. Reference numeral 80 denotes an ID reading block as an information acquirer that reads (acquires) ID information (first information) 52 from the transmitter 50. Reference numeral 81 denotes a UART processing block that performs a UART process depending on the UART signal from the transmitter 50. Reference numeral 82 denotes an RC processing block that performs an RC process depending on the RC signal from the transmitter 50. Reference numeral 84 denotes a transmitter-correspondence controlling block (controller) that causes the UART processing block 81 and the RC processing block 82 to perform processes depending on the specifications on the image and control signals of the transmitter (connected transmitter) 50 currently connected to the projector 70. As in Embodiment 1, the UART and RC processing blocks 81 and 82 correspond to plural processors that respectively perform mutually different processes corresponding to plural control signals, depending on specifications of the transmitter 50 on the control signals.

Reference numeral 83 denotes a MUX switching controlling block that controls switching of an MUX 75 as a selector. In a same manner as that in Embodiment 1, the MUX 75 switches (selects) signal paths (that is, channels) so as to introduce the demultiplexed UART and RC signals respectively to the corresponding UART and RC processing blocks 81 and 82.

Reference numeral 77 denotes a transmitter ID-specification correspondence table. In a same manner as that in Embodiment 1, the transmitter ID-specification correspondence table 77 includes information (second information) indicating specifications on the image and control signals of each of plural transmitters having mutually different specifications thereon, the information having correspondence with the ID information of each transmitter.

Detailed contents of the specifications of the transmitter 50 in this embodiment are identical to the items 1 to 4 described in Embodiment 1. Moreover, an example of the transmitter ID-specification correspondence table 77 is identical to that described in Embodiment 1 with reference to FIGS. 5A and 5B.

Figure 8A:
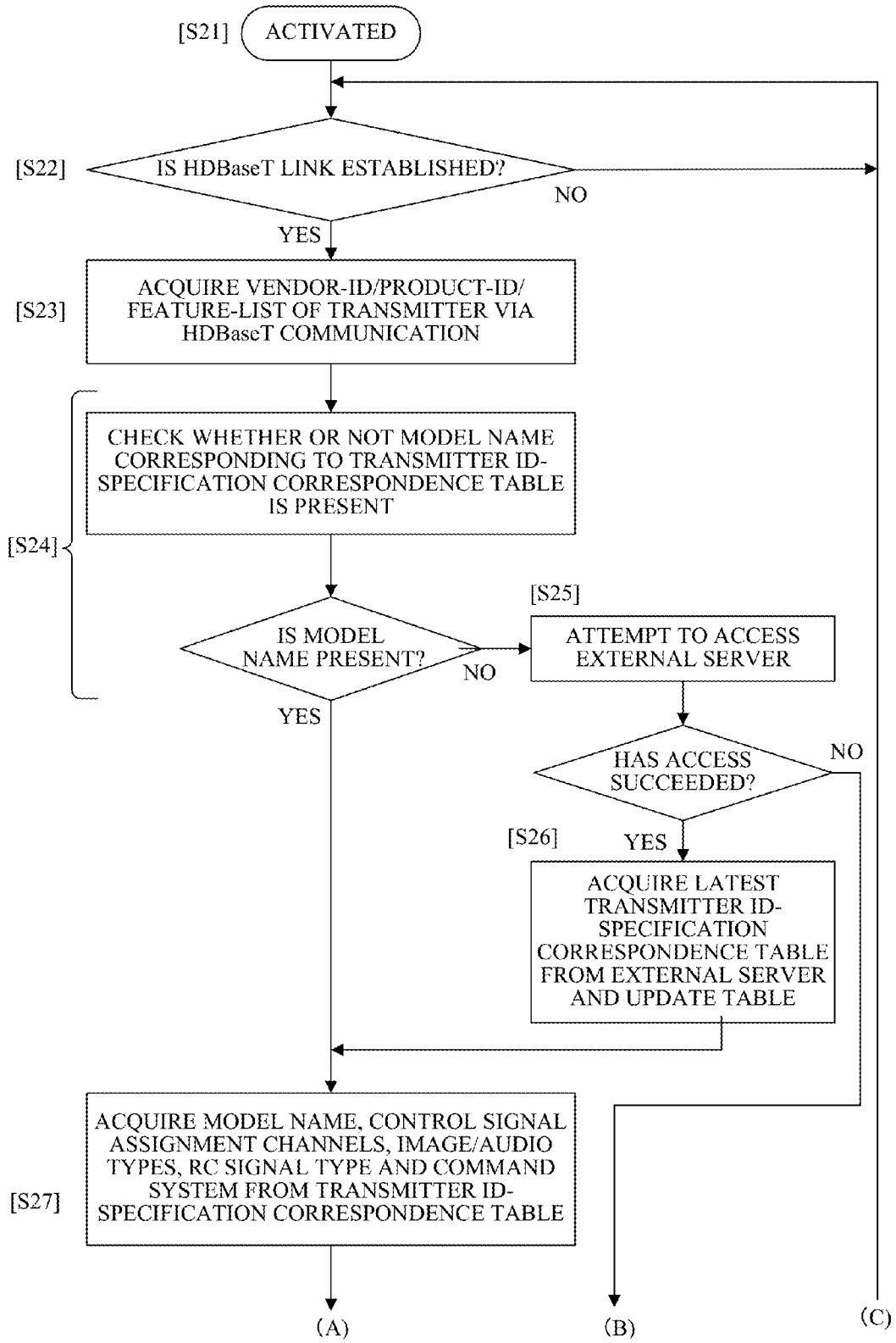
FIGS. 8A and 8B together show a flowchart illustrating a processing procedure in Embodiment 2.
Figure 8B:
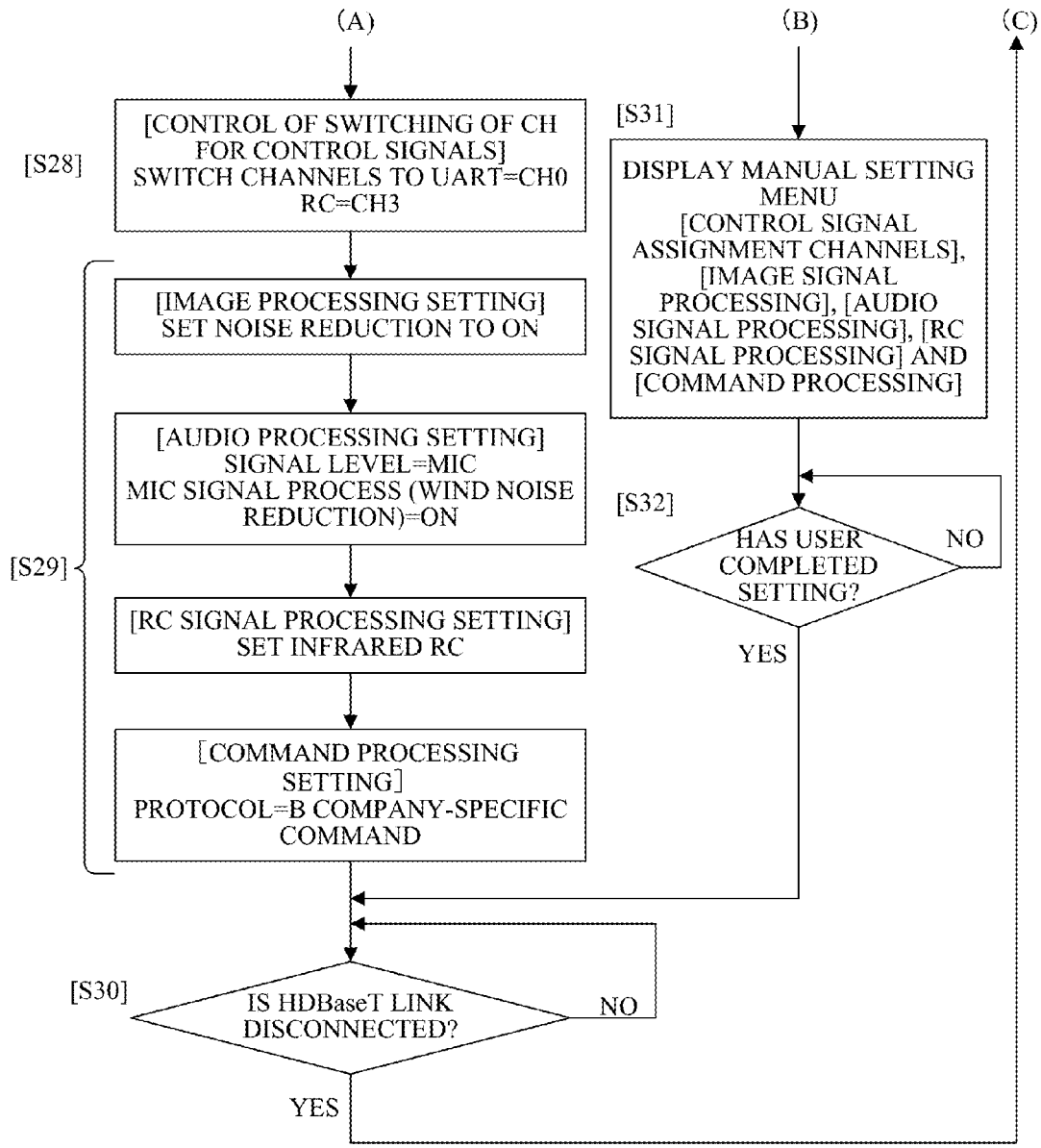

Next, with reference to a flowchart shown together by FIGS. 8A and 8B, description will be made of a receiving control process (receiving control method) executed in this embodiment by the projector MPU 76 as a computer according to a receiving control program for multiplex transmission as a computer program.

At step S21, the projector MPU 76 is activated and supplies power to the receiving device 71.

Next, at step S22, the projector MPU 76 checks, as in Embodiment 1, whether or not communication with the transmitter 10, namely, the HDBaseT link is established. When the link is not established, the projector MPU 26 periodically repeats the check until the link is established.

Next, at step S23, as in Embodiment 1, the projector MPU 76 acquires the ID information (first information) 52 of the transmitter 10 via HDBaseT communication through the cable.

Next, at step S24, the projector MPU 76 checks whether or not the model name corresponding to the acquired ID information 52 is present in the transmitter ID-specification correspondence table 77. If the model name is present, the projector MPU 76 proceeds to step S27. On the other hand, if the model name is not present, the projector MPU 76 proceeds to step S25. For instance, when the Vendor-ID is bbbb and the transmitter ID-specification correspondence table 77 is identical to the table 35 illustrated in FIG. 5A, the Vendor-ID(=bbbb) is not present in the table 77. Therefore, the projector MPU 76 proceeds to step S25.

At step S25, the projector MPU 76 attempts to access an external server 78 through an Internet site. If succeeding the access thereto, the projector MPU 76 proceeds to step S26. If not succeeding the access thereto, the projector MPU 76 proceeds to step S31.

At step S26, the projector MPU 76 acquires latest information on the transmitter ID-specification table from the external server 78. Thereafter, the projector MPU 76 updates the existing transmitter ID-specification correspondence table 77 by using the latest transmitter ID-specification correspondence table so acquired.

FIGS. 9A and 9B illustrate an example of an updated transmitter ID-specification correspondence table 77'. The updated table 77' includes the following information on a model name (B1) added to the table 77 before the updating illustrated in FIGS. 5A and 5B.

Vendor-ID=bbbb

Product-ID=pqpq

[Control Signal Assignment Channels]

UART signal=channel 3

RC signal=channels 4 and 5

[Image/Audio Types]

image=VGA/Component audio=MIC×2

[RC Signal Type]

infrared RC (front and rear)

carrier signal (frequency: 38 kHz)

[Command System]

B company-specific command

At step S27, the projector MPU 76 reads, from the existing transmitter ID-specification correspondence table 77, specification information (second information) corresponding to the acquired model name of the transmitter.

Next, at step S28, the projector MPU 76 controls the switching of the MUX 75 depending on the information on the "control signal assignment channels" acquired at step S27. Specifically, when the ID information 52 includes:

Vendor ID=bbbb; and

Product-ID=pqpq, and the model name is (B1), the projector MPU 76 switches the MUX 75 such that the UART signal is input to CH3 and the RC signals are respectively input to CH4 and CH5.

Subsequently, at step S29, the projector MPU sets, depending on the "image/audio types", "RC signal type" and "command system" acquired at step S27, processes for the respective signals. In other words, the projector MPU 76 sets processing methods performed by the image signal processor 73, the UART processing block 81 and the RC processing block 82. Specifically, the projector MPU 76 performs the following settings.

[Image Signal Processing]

The projector MPU 76 sets an analog noise reduction to on because an input image source is an analog (VGA) image.

[Audio Signal Processing]

The projector MPU 76 sets a signal processing level to a MIC level and sets a microphone sound process (wind noise reduction) to on because an input sound source is a microphone sound.

[RC Signal Processing]

The projector MPU 76 performs an LPF process at a frequency of 38 kHz on RC1 and RC2 signals input to the projector MPU 76 to make a setting that extracts a base band signal because the carrier signal has a frequency of 38 kHz. In addition, the projector MPU 76 makes a setting that performs a dual-system process because an input RC source is an infrared RC signal and two RC systems are provided at the front and rear.

[Command Processing]

Since the transmitter 50 performs conversion of the input command into the B company-specific command, the projector MPU 76 sets the projector (receiver) 70 so as to receive and decode the B company-specific command and convert the B company-specific command into the in-company command. The projector MPU 76 is provided with a table for other company-specific commands and converts the other company-specific commands into the in-company command by using information in the table.

Next, at step S30, the projector MPU 76 checks whether or not the HDBaseT link is disconnected. When the link is not disconnected, the projector MPU 76 determines that the connected transmitter 50 is not changed and then repeats the check at this step. When the link is disconnected, the projector MPU 76 determines that the connected transmitter 50 is changed and then returns to step S22 to again perform the receiving control process starting from the acquisition of the ID information from the transmitter 50.

At step S31, the projector MPU 76 displays a manual setting menu by GUI. Items that a user can set through the manual setting menu are [control signal assignment channels], [image signal processing], [audio signal processing], [RC signal processing], [command processing] and others. Initially displayed settings of the respective items are ones corresponding to the specification information acquired at step S27 (for example, "analog noise reduction on" for [image signal processing] and "conversion into in-company command" for [command processing].

The projector MPU 76 waits until the user performs selection and decision operations on the respective items and then makes settings depending on the selection results for the respective items. Thereafter, the projector MPU 76 proceeds to step S30.

According to Embodiment 2 described above, the projector (receiver) is capable of identifying the specifications of the connected transmitter and performing settings for the projector suitable for the specifications, which makes it possible to provide an improved compatibility for connection between the transmitter and the projector that are provided by mutually different manufacturers. Moreover, in this embodiment, the projector has a function of updating the existing transmitter ID-specification correspondence table by a newly transmitter ID-specification correspondence table acquired from its outside, so that the projector is compatible also with a transmitter newly connected thereto.

Although each of Embodiments 1 and 2 described the case where both of the switching control of the signal paths by the MUX and the setting of the processes performed by the UART and the RC processing blocks, an alternative embodiment may perform at least one of them.

Moreover, although each of Embodiments 1 and 2 described the receiver included in the projector, an alternative embodiment may be configured such that the receiver is included in an apparatus other than the projector or is a separate receiver.

Each of Embodiments 1 and 2 enables realizing a receiver capable of performing appropriate processes corresponding to a control signal and an image signal that are multiplexed and transmitted from various transmitters having mutually different specifications and realizing a display apparatus including the receiver.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-112835, filed on May 30, 2014, which is hereby incorporated by reference herein in its entirety.

What is claimed is:

1. A receiver connectable to at least one of plural transmitters and configured to receive, from a connected transmitter of the plural transmitters, a transmission signal in which an image signal and a control signal are multiplexed, the plural transmitters having mutually different specifications on the control signal, the receiver comprising:
    a demultiplexer configured to demultiplex the transmission signal received from the connected transmitter into the image signal and the control signal;
    a selector configured to select a signal path for the demultiplexed control signal;
    an information acquirer configured to acquire first information for identifying the connected transmitter; and
    a controller configured to control the selection of the signal path by the selector such that the signal path corresponding to the specification acquired by using the first information is selected.

2. A receiver according to claim 1, wherein the controller is configured to acquire, by using the first information, second information indicating the specification of the connected transmitter and to control the selection of the signal path by the selector such that the signal path corresponding to the second information is selected.

3. A receiver according to claim 1, wherein the information acquirer is configured to acquire, from the connected transmitter, the first information stored in the connected transmitter.

4. A receiver according to claim 2, wherein the controller is configured to store the second information corresponding to each of the plural transmitters and to select and acquire the second information corresponding to the connected transmitter by using the first information acquired by the information acquirer.

5. A receiver according to claim 4, wherein the controller is configured to acquire, from its outside, the second information corresponding to each of the plural transmitters and update thereby the second information stored in the controller.

6. A receiver according to claim 2, wherein the selector is configured to determine, from the second information, an assigned channel for the control signal in the connected transmitter and to control the selection of the signal path depending on the assigned channel.

7. A receiver according to claim 1,
    wherein:
    the control signal includes a command signal and a remote control signal, and
    the specification includes a specification on the command signal and a specification on the remote control signal.

8. A receiver according to claim 2, further comprising an image processor configured to perform a process on the image signal,
    wherein:
    the second information includes information indicating a specification on the image signal, and
    the controller is configured to perform a setting of the process performed by the image processor depending on the information indicating the specification on the image signal.

9. A receiver according to claim 2, wherein the controller is configured to display, depending on the second information, a menu allowing a user to set the selection of the signal path.

10. A display apparatus comprising:
    a receiver connectable to at least one of plural transmitters and configured to receive, from a connected transmitter of the plural transmitters, a transmission signal in which an image signal and a control signal are multiplexed, the plural transmitters having mutually different specifications on the control signal; and a displayer configured to display an image corresponding to the image signal output from the receiver, wherein:

the receiver comprises:

a demultiplexer configured to demultiplex the transmission signal received from the connected transmitter into the image signal and the control signal;

a selector configured to select a signal path for the demultiplexed control signal;

an information acquirer configured to acquire first information for identifying the connected transmitter; and a controller configured to control the selection of the signal path by the selector such that the signal path corresponding to the specification acquired by using the first information is selected.

11. A non-transitory computer-readable storage medium storing a computer program to operate a computer included in a receiver, the receiver being connectable to at least one of plural transmitters and configured to receive, from a connected transmitter of the plural transmitters, a transmission signal in which an image signal and a control signal are multiplexed, the plural transmitters having mutually different specifications on the control signal, wherein the computer program is configured to cause the computer to:

demultiplex the transmission signal received from the connected transmitter into the image signal and the control signal;

select a signal path for the demultiplexed control signal;

acquire first information for identifying the connected transmitter; and control the selection of the signal path by the selector such that the signal path corresponding to the specification acquired by using the first information is selected.

* * * * *